US008291811B2

(12) United States Patent  
Brezovnik et al.

(10) Patent No.: US 8,291,811 B2
(45) Date of Patent: Oct. 23, 2012

(54) SAFETY VALVE FOR A MACHINE FOR PREPARING BREWED DRINKS

(75) Inventors: Peter Brezovnik, Mozirje (SI); Henrik Pavlovic, Slowenien (SI); Aleksander Sedovsek, Mozirje (SI); Igor Zibret, Smartno ob Paki (SI)

(73) Assignee: BSH Bosch und Siemens Hausgeraete GmbH, Munich (DE)

( * ) Notice: Subject to any disclaimer, the term of this patent is extended or adjusted under 35 U.S.C. 154(b) by 577 days.

(21) Appl. No.: 12/516,665

(22) PCT Filed: Nov. 21, 2007

(86) PCT No.: PCT/EP2007/062615
§ 371 (c)(1),
(2), (4) Date: May 28, 2009

(87) PCT Pub. No.: WO2008/077693
PCT Pub. Date: Jul. 3, 2008

(65) Prior Publication Data
US 2010/0071562 A1    Mar. 25, 2010

(30) Foreign Application Priority Data

Dec. 21, 2006    (DE) .................. 10 2006 060 746

(51) Int. Cl.
*A47J 31/24* (2006.01)

(52) U.S. Cl. .............................. 99/279; 99/295

(58) Field of Classification Search .................... 99/279, 99/280, 281, 282, 283, 295, 299, 304, 306
See application file for complete search history.

(56) References Cited

U.S. PATENT DOCUMENTS

| | | | | |
|---|---|---|---|---|
| 5,215,119 A * | 6/1993 | Bolivar | ....................... | 137/523 |
| 5,388,502 A | 2/1995 | Hufnagl | | |
| 5,515,771 A * | 5/1996 | Smit | ............................. | 99/280 |
| 7,854,194 B2 * | 12/2010 | Siu et al. | ....................... | 99/510 |
| 2004/0182248 A1 * | 9/2004 | Fischer | ........................ | 99/275 |
| 2005/0160918 A1 * | 7/2005 | Winstanley et al. | ............ | 99/279 |
| 2006/0144865 A1 * | 7/2006 | Yoshida et al. | ............... | 222/209 |
| 2006/0196363 A1 * | 9/2006 | Rahn | ............................. | 99/279 |
| 2007/0295220 A1 * | 12/2007 | Webster et al. | ................ | 99/290 |
| 2008/0302252 A1 * | 12/2008 | O'Brien et al. | ............ | 99/302 R |

FOREIGN PATENT DOCUMENTS

| | | |
|---|---|---|
| DE | 102004004833 A1 | 8/2005 |
| EP | 1440910 A1 | 7/2004 |
| EP | 1690482 A2 | 8/2006 |

* cited by examiner

*Primary Examiner* — William Pierce
(74) *Attorney, Agent, or Firm* — James E. Howard; Andre Pallapies

(57) ABSTRACT

A machine for preparing brewed drinks is provided and includes a brewing compartment for receiving drink substrate portions and a water supply for supplying a pressurized supply of water into the brewing compartment. The water supply is oriented in the brewing compartment in such that it would spray into a user region of the machine if the brewing compartment opens prematurely. However, a safety valve prevents the supplied water from entering into the brewing compartment when the brewing compartment is open.

11 Claims, 3 Drawing Sheets

SAFETY VALVE FOR A MACHINE FOR PREPARING BREWED DRINKS

BACKGROUND OF THE INVENTION

The invention relates to a machine for preparing brewed drinks with a brewing compartment for receiving drink substrate portions and with a water inlet for the pressurized supply of water into the brewing compartment which is directed into the brewing compartment in such a way that it sprays, at least indirectly, into a user area of the machine when the brewing compartment opens prematurely. The user area is that space in front of the drinks machine in which the user normally stands while operating the machine. The upper user area, where the face and hands of the user are located, should be protected in particular.

Drink substrate portions are widely available on the market for example as coffee pads or coffee capsules made of aluminum. Users open the brewing compartment, insert the drink portions and close the brewing compartment again. Hot water is then added to the drink portions. The hot water is as a rule pressurized. Safety precautions must therefore be taken to ensure that the user is not injured by the hot water if there is a malfunction. For this purpose, pressure-relief valves are normally provided, as disclosed for example in EP 1 690 482 A2. From DE 10 2004 004 833 A1 it is also known that safety switches can be installed on the brewing compartment which prevent the drinks machine from operating when the brewing compartment is open by switching off the heating unit and/or pump. These measures may not be enough, however, for example in a drinks machine where the water supply is directed upwards into the brewing compartment, as disclosed in EP 1 440 910 A1. If they activate even with only a slight delay, injuries to a user opening the brewing compartment prematurely cannot be largely excluded.

BRIEF SUMMARY OF THE INVENTION

The object of the invention is to provide a safety device which prevents the user from being injured if the brewing compartment is opened prematurely.

This object is achieved in a machine for preparing brewed drinks of the type mentioned above in accordance with the invention by a safety valve which is activated when the compartment is open, and already when the compartment is opening, and which immediately prevents the water from entering the brewing compartment. Injury to a user caused by discharging hot water or steam, which otherwise would flow directly towards the user from the brewing compartment, is therefore reliably and completely excluded.

With brewed drinks machines with a boiler or thermoblock for heating the water it usually suffices to switch off a pump which pumps the water from the heating unit to the brewing compartment. With brewed drinks machines with a through-flow heater, however, a higher temperature level prevails on the heat-transferring contact surface between the heater and the water being heated. The heater additionally pressurizes the water by heating it to or above steam temperature. It is therefore not enough to just switch off the pump in order to prevent steam from discharging. The invention therefore applies the principle that discharging hot water or steam is not allowed to flow into the brewing compartment uncontrolled and thus out of the machine. This is accomplished by preventing its entry into the brewing compartment. "Prevention" here is understood to mean any measure which stops water or steam entering the brewing compartment. This can be achieved by blocking the water supply as well as by draining or diverting it.

In accordance with an advantageous configuration of the invention, the activated safety valve can completely stop a further flow of hot water or pressurized steam into the brewing compartment when the brewing compartment is opened. This ensures that the user cannot be injured by hot water or steam.

If the water supply is blocked in the event of the brewing compartment being opened prematurely, excessive pressure can arise in the brewed drinks machine. If it exceeds a permissible maximum threshold it can trigger a pressure-relief valve in the drinks machine. Pressure-relief valves are usually installed in any event and generally prevent a brewed drinks machine from being damaged as a result of a fault condition or malfunction of the heating unit or pump. Activation of the pressure-relief valve can, however, give the user the impression that the machine has been damaged. In accordance with an alternative configuration of the invention, the water inlet can therefore exhibit a branch which enables the brewing compartment to be bypassed and the activated safety valve to be released. This enables at least part of the discharging water or steam to be kept away from the brewing compartment, relieves any excessive pressure and thus avoids activation of the pressure-relief valve, reducing the risk of injury to the user.

The diverted portion of the hot and pressurized water or steam—hereinafter referred to for the sake of simplicity as 'the fluid'—can be increased by configuring the flow resistance of the branch so that it is lower than that of the path into the brewing compartment. A simple way of doing this is provided by the selection of the pipe diameter. The diameter of the branch can be selected so that it is significantly wider than that for the water supply to the brewing compartment. Therefore, as soon as the safety valve frees the way into the branch, the fluid flows along the lower resistance, i.e. essentially into the branch and therefore not into the brewing compartment. The larger the difference in diameter is between the branch and the water supply inlet to the brewing compartment, the more completely the fluid flows into the branch.

The maximum resistance is naturally reached when the safety valve completely blocks the flow into the brewing compartment. It then represents an "or" valve which either—in the normal or non-activated condition—permits a flow into the brewing compartment, or—in the activated condition—frees the way into the branch in order to bypass the brewing compartment and diverts the fluid.

In accordance with a further advantageous configuration, an exit of the safety valve can be connected to an outlet. If it is activated—either when blocking the water supply or diverting it—the safety valve connects the water supply to the outlet, so that excessive fluid is diverted to the outlet. The outlet is advantageously directed away from the user and diverts the excess fluid away so that the user is not injured. It can for example be channeled into a water tank, into a drip tray or into the drinks outlet and thus into a cup placed in the machine.

The safety valve is therefore functionally connected to the brewing compartment so that it reliably responds at least if the brewing compartment is opened prematurely. To this end, it can be connected to a sensor which detects a corresponding condition of the brewing compartment and if necessary triggers the safety valve. In accordance with a further advantageous configuration of the invention, the safety valve is coupled directly with an operating device for opening and closing the brewing compartment. As a result, operation of the safety valve is no longer dependent on an opening or closing of the brewing compartment. As the brewing compartment can be opened or closed exclusively by the operating device, a direct coupling of the safety valve with the operating device leads to a more direct and earlier activation of the safety valve if and as soon as incorrect operation occurs. Activation of the safety valve therefore becomes more reliable, which improves the operating safety of the brewed drinks machine.

The safety valve can be coupled with the operating device for example via a sensor or an electrical switch. In accordance with an advantageous configuration of the invention, however, the safety valve is mechanically coupled with the operating device as activation of the safety valve is then not susceptible to electronic faults. Moreover, it is generally easier to repair in the event of a malfunction.

If the water inlet enters the brewing compartment from below, the water being supplied flows in one direction upwards into the brewing compartment. To ensure proper functioning of the water inlet at all times, it can be protected from dirt, and in particular from blockages, by a diaphragm valve. The diaphragm valve closes the water inlet at atmospheric pressure. The pressure at which hot water is pumped into the brewing compartment, however, opens the diaphragm valve so that the hot water enters the brewing compartment for drinks preparation. In accordance with a further advantageous configuration of the invention, the safety valve is switched in parallel with the diaphragm valve. The pressurized water can therefore be conducted away either through the diaphragm valve or through the safety valve. The path taken by the water can be fixed by resistances which have to be overcome to open the valves. As the diaphragm valve offers the lower resistance when the safety valve is closed, the hot water flows through the diaphragm valve into the brewing chamber during normal operation of the brewed drinks machine. During a malfunction of the brewed drinks machine the safety valve opens. Now the path through the safety valve offers the lower resistance and the hot water or steam flows via the safety valve into the outlet. It is therefore not even necessary for the safety valve to actively block the way into the brewing compartment. It suffices completely that it opens a path of lower resistance than through the diaphragm valve. In this way too hot water or steam is effectively prevented from flowing out through the brewing compartment.

In accordance with a further advantageous configuration of the invention, the safety valve exits into a drinks outlet of the brewing compartment. The drinks outlet from the compartment is as a rule directed vertically downwards and therefore not towards the user. Moreover, when a drink is being prepared a cup is as a rule placed under the drinks outlet to catch the fluids from the drinks outlet. A discharge of hot water or steam from the drinks outlet of the brewing compartment is therefore as a rule completely harmless to the user. The coupling of the exit of the safety valve with the drinks outlet from the brewing compartment furthermore represents a simple design solution because it provides a short route for draining off the water or steam in the event of a fault. The technical effort for draining off the excessive water or steam is therefore low and the arrangement is cheap to produce.

The mechanical coupling between the safety valve and the operating device should be designed to be as simple as possible so that it will function reliably for a long time without any maintenance effort. An advantageous configuration can therefore consist in a spring-loaded actuator, for example a rocker or a slide valve. When the brewing compartment is closed it holds the safety valve closed against the spring bias by supporting itself on the operating device as a thrust bearing. When the brewing compartment is open the thrust bearing is absent and the spring presses the safety valve into its open position.

The closed position of the safety valve is therefore produced by spring bias. It presents a counterforce to the pressure loading of the hot water or the steam which acts on the safety valve during operation. If a component in the chain of operating device and actuator for operating the safety valve fails, the thrust bearing for the spring force as a rule ceases to act. The closing force can then no longer be reliably applied and the safety valve opens. In the event of a fault of the safety valve or its mechanical coupling with the operating device, the user cannot therefore suffer any harm. This configuration of the mechanical coupling thus ensures the safety of the user even if the mechanical coupling is damaged. As a result, the operating safety of the brewed drinks machine is further increased.

BRIEF DESCRIPTION OF THE DRAWINGS

The principle of the invention is explained in more detail below with reference to an exemplary drawing, in which.

DETAILED DESCRIPTION OF THE PRESENT INVENTION

Figure 1:
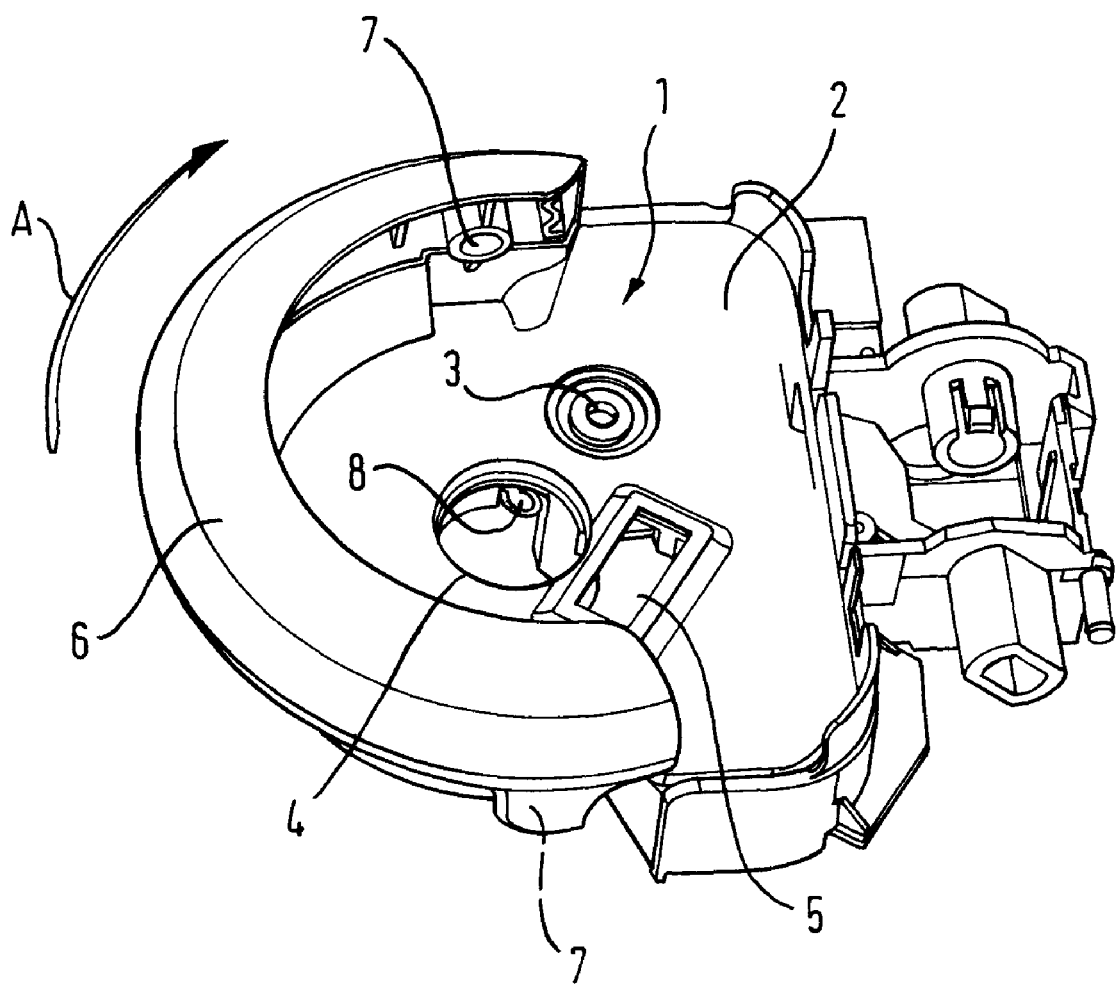
FIG. 1 shows a perspective view of the brewing head of a drinks machine.

In FIG. 1 a brewing head of a multi drinks machine is shown, which brewing head forms the bottom part of a brewing compartment 1. The brewing compartment 1 is confined at the lower end by a compartment base 2 in which centrally a drinks outlet 4, to the top right of which in the illustration a diaphragm valve 3 and below an outlet window 5 are arranged. In the installed condition the left side of the brewing head faces towards a user. A semicircular lever 6 is located there as the operating device for the brewed drinks machine. It is swivel-mounted in bushes 7 so that it can be turned upwards through approx. 90 degrees in arrow direction A. This opens the brewing compartment 1, so that it is accessible to the user for inserting a drink portion.

After a drink portion has been inserted in the brewing compartment 1 and this has been closed using lever 6, preparation of the drink can be started. On the underside of the drink portion there is a barcode which is scanned through the readout window 5, providing control data for the drinks machine. A puncturing device (not shown) opens the drink portion. Brew-hot water, which is conducted through the diaphragm valve 3 into the brewing compartment 1, produces a drink which discharges from the brewing compartment 1 via the drinks outlet 4 into a cup provided. An opening 9 of a branch 8 can be recognized through the drinks outlet 4, which branch will be described in more detail later.

The water for drinks preparation enters the brewing compartment 1 through the diaphragm valve 3, flowing upwards from the compartment base 2. If owing to incorrect operation by the user the brewing compartment 1 is not closed, the danger exists, without the inventive countermeasures explained below, that the user will be injured by discharging hot water or steam.

Figure 2:
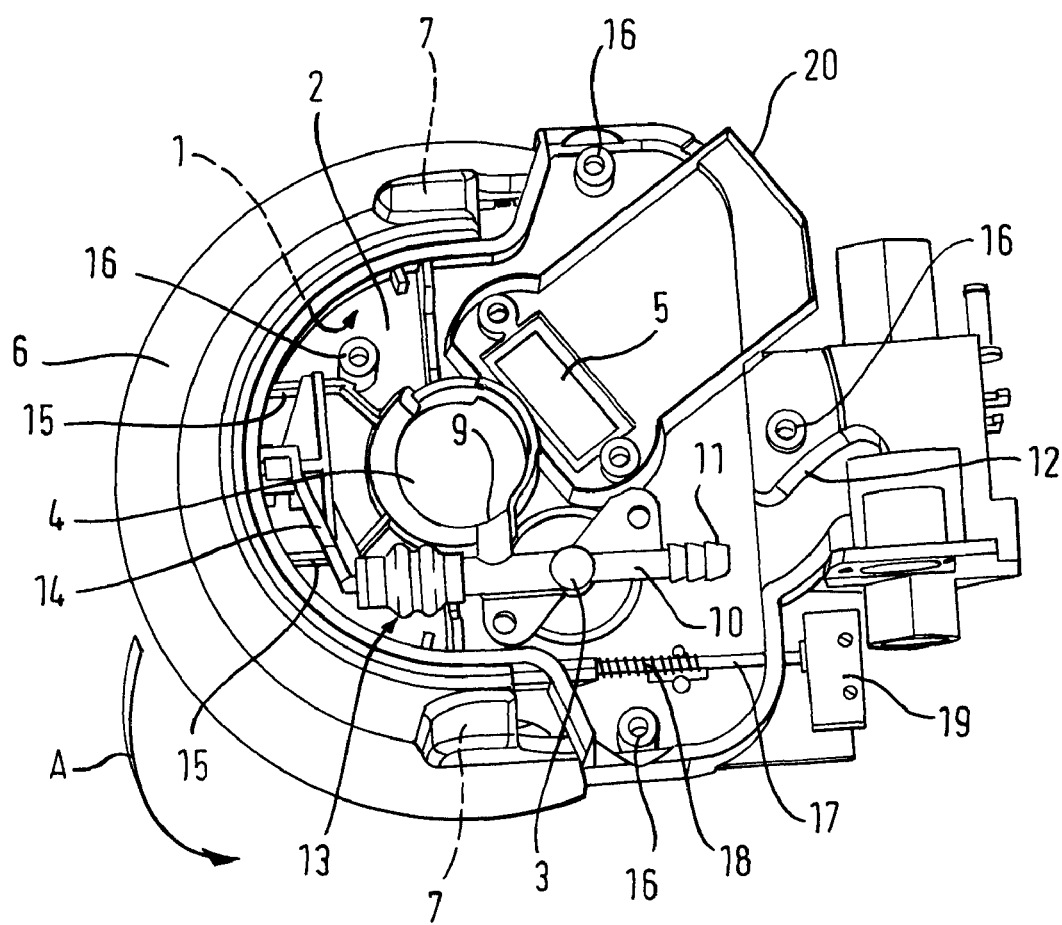
FIG. 2 shows a perspective view of the brewing head from below.

FIG. 2 offers a view of the underside of the brewing head 1 as in FIG. 1. It is turned through a longitudinal axis so that the lever 6 is still on the left-hand side. Its operation along the direction of arrow A now takes place in the direction seen from the picture level and downwards. The drinks outlet 4 is still in the middle of the picture, and in relation to it the readout window 5 is now located above and to the right in a readout unit 20 and the diaphragm valve 3 is located below to the right.

The diaphragm valve 3 receives its water supply through a water inlet 10, which is fitted with a barb-shaped ribbed mouthpiece 11 onto which a flexible hose can be pushed. It runs through a hose guide 12 into the interior of the drinks machine. Downstream of the diaphragm valve 3 the water inlet 10 enters a safety valve 13. Between the safety valve 13 and the diaphragm valve 3 the branch 8 branches off from the water inlet 10 and ends below the drinks outlet 4 in an opening 9.

A slide valve 14 is connected to the end of the safety valve 13 located opposite the water inlet 10. It slides on two guide ribs 15 which interact with two corresponding guide ribs on a lid not shown. As a result, the slide valve 14 can be moved linearly in horizontal direction on an axis between the lever 6 and the drinks outlet 4. On the underside of the compartment base 2 four bushes 16 for fastening screws are located for fastening the lid not shown.

The lever 6 is also connected to a microswitch 19 by a drive rod 17. When the brewing compartment 1 is opened by moving the lever 6 in the direction of the arrow A, a spring 18 pushes the drive rod 17 to the left. The movement of the drive rod 17 activates the microswitch 19. The heating unit of the brewed drinks machine is connected to it and is immediately switched off when the brewing compartment 1 is opened by the lever 6.

Figure 3:
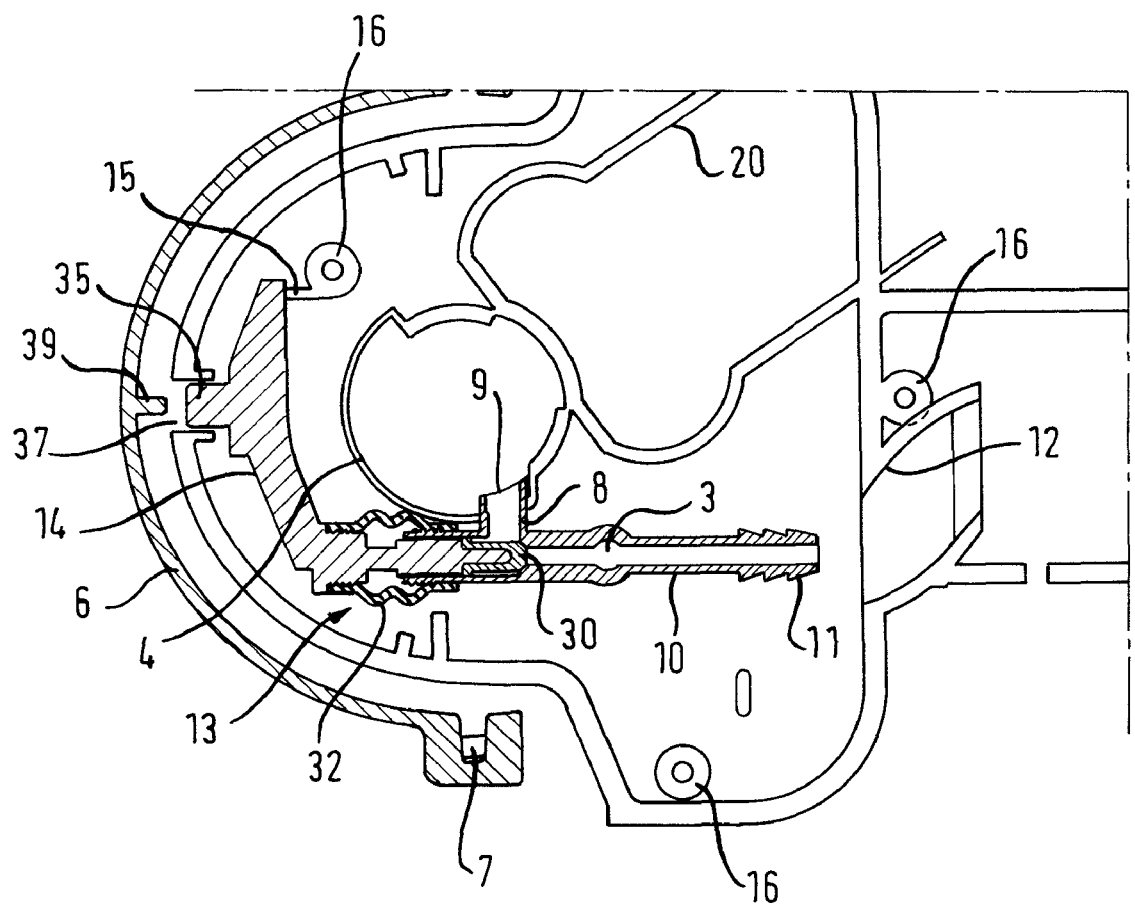
FIG. 3 shows a schematic cutaway of the view in FIG. 2.

In the simplified cutaway in FIG. 3 the mode of operation of valve 13 is more clearly shown. Here some parts of the brewing head which are less relevant are only represented schematically. As in FIG. 2 a readout unit 20 adjoins the drinks outlet 4 top right. The branch 8 from the water inlet 10 enters the drinks outlet 4 with its opening 9. In the cutaway of the safety valve 13 the diaphragm valve 3 can only be recognized as a widening connection in the water inlet 10, whose head 11 points in the direction of the hose guide 12.

The safety valve 13 contains a piston 30 which blocks the water inlet 10 upstream of the branch 8. The piston 30 is mechanically connected to the slide valve 14 and can only be moved with it. A bellows 32 serves the purpose of sealing and prestressing the safety valve 13 in its opening direction, and therefore moving the piston 30 to the left. It not only prestresses the piston 30 but also moves the slide valve 14. This comprises a cam 35 with which it is held so that it can be moved horizontally into an opening 37 in the housing of the brewing head. A lug 39 on the lever 6 is assigned to the cam 35 as a thrust bearing. It protrudes into the opening 37 and presses on the cam 35 as soon as the lever 6 rests in the illustrated closed position, i.e. its horizontal and not swiveled position. Via the cam 35 the lug 39 pushes the slide valve 14 to the right and thus against the prestressing of the bellows 32 of the safety valve 13. This illustrated position represents the closed position of the safety valve 13, in which water or hot steam enters the brewing compartment via the water inlet 10 through the diaphragm valve 3.

As soon as the lever 6 is now swiveled in its open position the lug 39 slides out of the opening 37. As a result, the cam 35 loses its thrust bearing. The bellows 32 then pushes the slide valve 14 to the left, which through the absence of the lug 39 is no longer prevented from doing so. The slide valve 14 takes the piston 30 with it as it moves. Having likewise moved to the left, the piston 30 frees the way from the water inlet 10 into the branch 8. This way offers the hot water or steam a lower resistance than diaphragm valve 3 because it can flow to the opening 9 without being impeded and does not have to overcome the resistance of the diaphragm in the diaphragm valve 3. The diaphragm valve 3, whose exit, when the brewing compartment is open, is directed towards a user standing in front of the drinks machine therefore remains closed. The hot water or steam flows through the branch 8 into the drinks outlet 4 and thus into a cup or a drip tray. The user therefore cannot be injured by a discharge of water or steam under excessive pressure.

As the brewing head described in detail above is an exemplary embodiment, it can be modified in the usual way by an expert to a wide extent without leaving the area of the invention. In particular the concrete configuration of the safety valve can take a different form than in the one described here. Likewise, the relative position of the safety valve, outlet, readout window etc. to each other within the brewing compartment can be configured in a different way if this is necessary for reasons of space or design. In addition, the use of the indefinite article "a" or "an" does not preclude the features concerned from being present in a plurality.

REFERENCE NUMBER LIST

1 Brewing compartment base
3 Diaphragm valve
4 Drinks outlet
5 Readout window
6 Lever
7 Bush
8 Branch
9 Opening
10 Water inlet
11 Mouthpiece
12 Hose guide
13 Safety valve
14 Slide valve
15 Guide rib
16 Bush
17 Driver rod
18 Spring
19 Microswitch
20 Readout unit
30 Piston
32 Bellows
35 Cam
37 Opening
39 Lug

The invention claimed is:

1. A machine for preparing brewed drinks, the machine comprising:
   a brewing compartment including a lid and a base, the brewing compartment being accessible using the lid for permitting a drink substrate portion to be inserted into the brewing compartment;
   a water inlet for supplying pressurized water to the brewing compartment, the water inlet supplying pressurized water into the brewing compartment in a manner such that, if the brewing compartment were to be opened while pressurized water is being supplied into it, water would spray from the brewing compartment into a user area of the machine;
   a safety valve, disposed along the pressurized water inlet downstream of a hot water source, the safety valve being operable to control the flow of supplied water; and
   a safety valve operator assembly operably associated with the lid to operate the safety valve using the lid, thereby preventing supplied water from entering the brewing compartment when the brewing compartment is open, and thereby preventing water from the brewing compartment from spraying into the user area of the machine.

2. The machine for preparing brewed drinks as claimed in claim 1, wherein the safety valve includes a blocking assembly that, upon activation, blocks the water supply into the brewing compartment when the brewing compartment is open.

3. The machine for preparing brewed drinks as claimed in claim 1 and further comprising a branch in the water inlet for bypassing the brewing compartment and the safety valve, upon activation, guides water to the branch when the brewing compartment is open.

4. The machine for preparing brewed drinks as claimed in claim 3, wherein the safety valve includes an assembly that, upon activation, connects the water inlet to an outlet.

5. The machine for preparing brewed drinks as claimed in claim 1 wherein the safety valve operator assembly includes an operating device associated with the lid for opening and closing the brewing compartment, wherein the safety valve is operatively coupled to the operating device.

6. The machine for preparing brewed drinks as claimed in claim 5, wherein the safety valve is operatively coupled to the operating device via a mechanical coupling.

7. The machine for preparing brewed drinks as claimed in claim 1 and further comprising a diaphragm valve between the water inlet and the brewing compartment, the diaphragm valve being switched in parallel with the safety valve.

8. The machine for preparing brewed drinks as claimed in claim 1, wherein an exit of the safety valve enters an outlet of the brewing compartment.

9. The machine for preparing brewed drinks as claimed in claim 5 and further comprising a spring-loaded switch element, which, in an unloaded condition, holds the safety valve in its open position and, in a loaded condition, is held by the operating device when the operating device is in a closed position.

10. A machine for preparing brewed drinks, the machine comprising:
 a brewing compartment including a lid and a base, the brewing compartment being accessible using the lid for permitting a drink substrate portion to be inserted into the brewing compartment;
 a water inlet for supplying pressurized water to the brewing compartment, the water inlet supplying pressurized water into the brewing compartment in a manner such that, if the brewing compartment were to be opened while pressurized water is being supplied into it, water would spray from the brewing compartment into a user area of the machine;
 a safety valve, disposed along the pressurized water inlet, the safety valve being operable to control the flow of supplied water;
 a branch in the water inlet for bypassing the brewing compartment and the safety valve, upon activation, guides water to the branch when the brewing compartment is open; and
 a safety valve operator assembly operably associated with the lid to operate the safety valve using the lid, thereby preventing supplied water from entering the brewing compartment when the brewing compartment is open, and thereby preventing water from the brewing compartment from spraying into the user area of the machine.

11. The machine for preparing brewed drinks as claimed in claim 10, wherein the safety valve includes an assembly that, upon activation, connects the water inlet to an outlet.

\* \* \* \* \*